United States Patent [19]

Fischer et al.

[11] 4,233,804
[45] Nov. 18, 1980

[54] CORN HEAD SNAPPING ROLLS

[75] Inventors: Thomas R. Fischer, Wapakoneta; Robert A. Stelzer, Celina, both of Ohio

[73] Assignee: Paul Revere Corporation, Greenwich, Conn.

[21] Appl. No.: 28,099

[22] Filed: Apr. 9, 1979

[51] Int. Cl.³ .................................... A01D 45/02
[52] U.S. Cl. .................................... 56/104
[58] Field of Search ............... 56/104, 106, 107, 14.1, 56/14.2, 119; 130/5 A, 5 B, 5 C, 5 D, 5 E

[56] References Cited

U.S. PATENT DOCUMENTS 3,174,484  3/1965  Anderson ..................... 56/104 X
3,858,384  1/1975  Maiste et al. ................. 56/104

Primary Examiner—Jay N. Eskovitz
Attorney, Agent, or Firm—Abraham Ogman; Robert J. McNair

[57] ABSTRACT

A pair of generally parallel snapping rolls are disclosed which mount beneath a stripper plate having a fore and aft extending slot through which stalks of corn may pass. The snapping rolls rotate in opposite directions and serve to draw stalks downwardly until the ears thereof strike the stripper plate and are snapped free. Each snapping roll has longitudinally extending flutes, the flutes of one roll being interleaved with those of the second roll. On each roll, the odd numbered (1, 3, 5, etc.) flutes extend radially outward while the even numbered (2, 4, 6, etc.) flutes extend outward at a non-radial angle. Rotating the two rolls in synchronism thus results in the generation of a cyclic narrow and wide spacing sequence between opposing flutes. This cyclic action provides improved efficiency in the harvesting operation.

7 Claims, 5 Drawing Figures

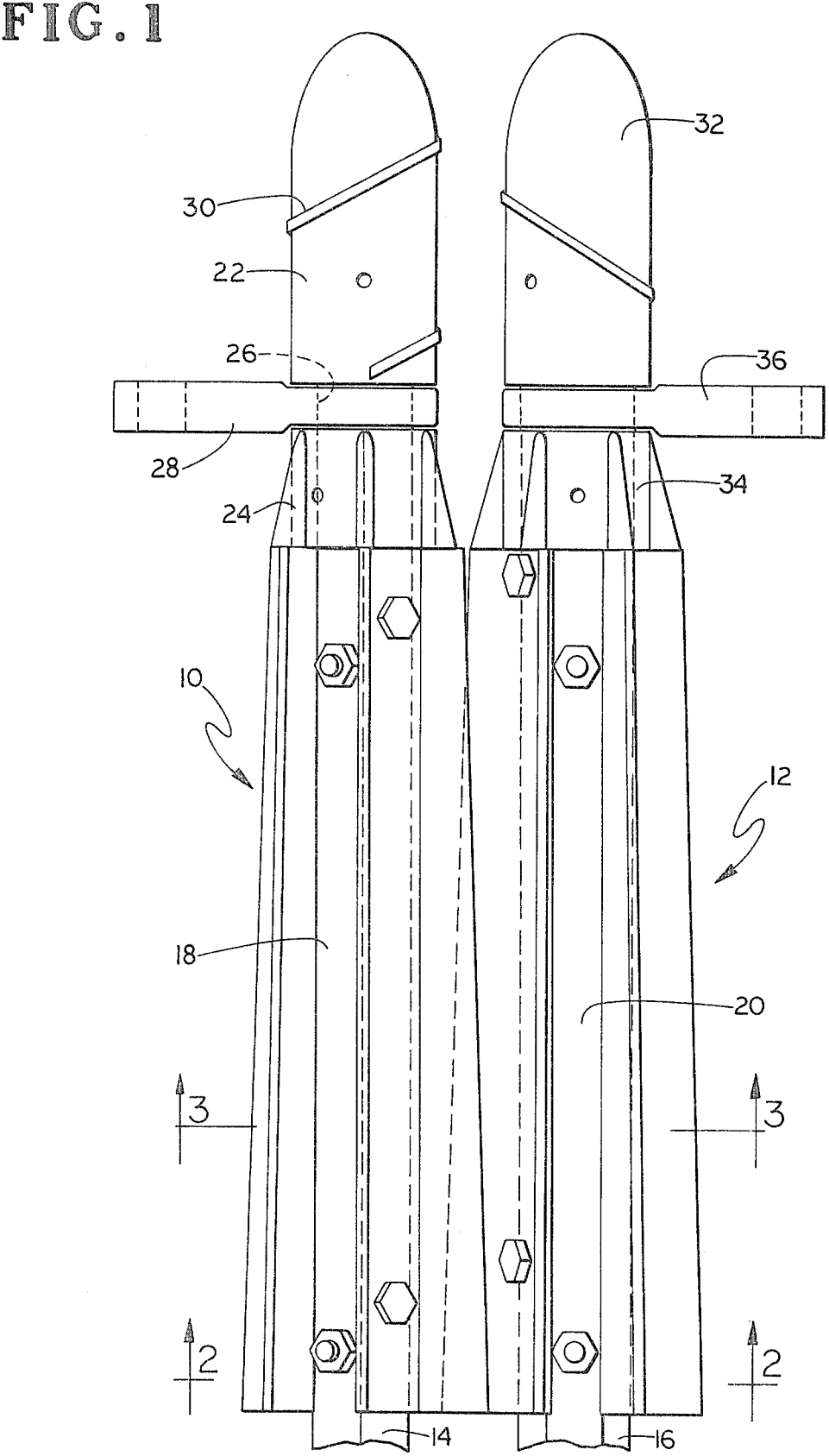

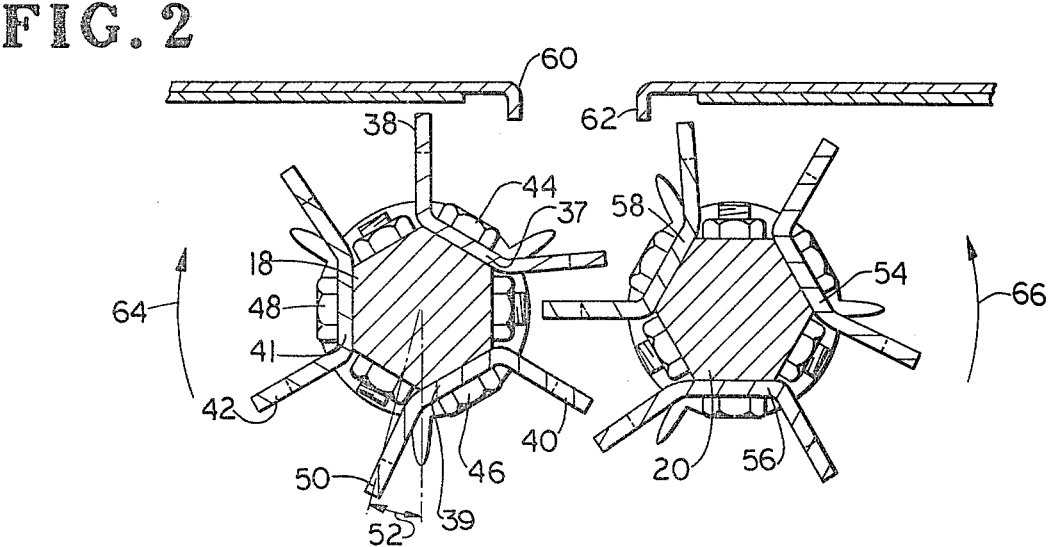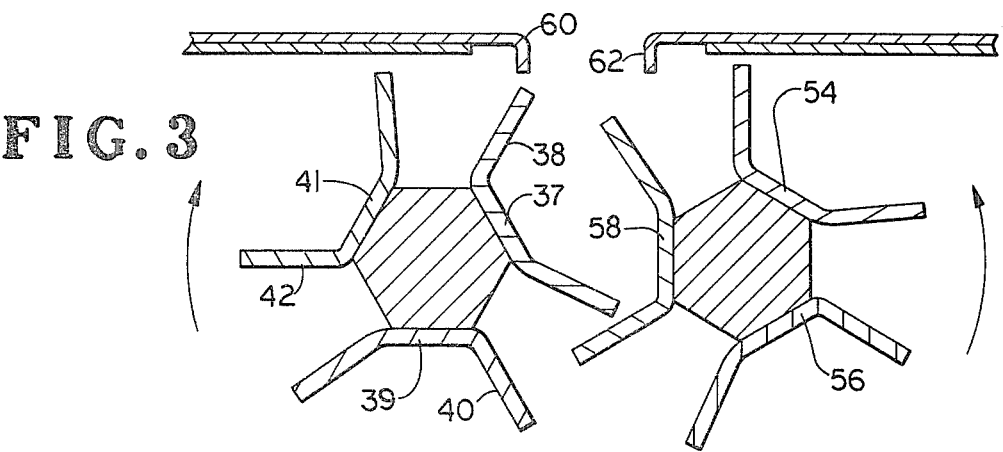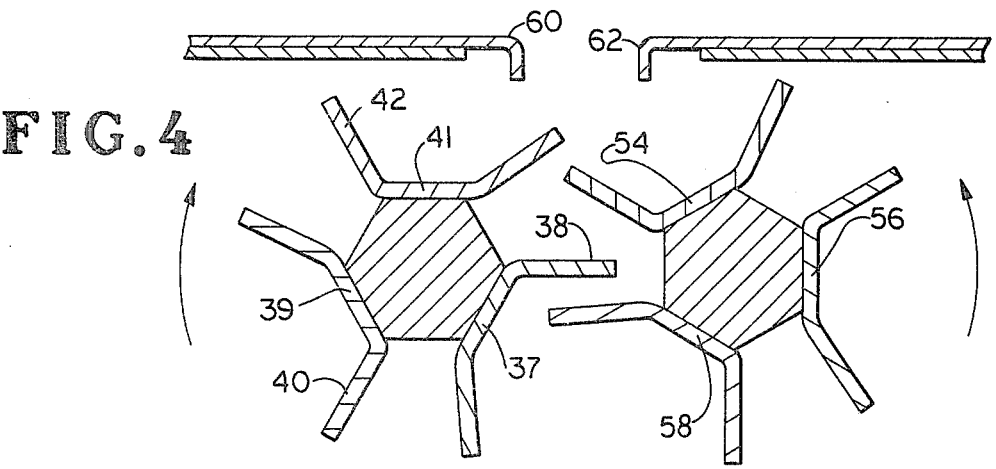

CORN HEAD SNAPPING ROLLS

BACKGROUND OF THE INVENTION

This invention relates to a pair of corn head snapping rolls which are an integral part of each row unit in the corn head attachment of crop processing units such as combines, shellers, husking units and forage harvesters. Each such row unit utilizes a pair of counter-rotating snapping rolls mounted beneath the fore and aft extending slot of a stripper plate. In operation, the combine, with corn head in place, traverses a field so that stalks of corn enter the throat of each row unit. Each stalk entering the fore and aft extending slot of the stripper plate will be grasped between the snapping rolls. They will draw the stalk of corn downward until the ear makes contact with the stripper plate. The slot width in the stripper plate is not wide enough to allow passage of the ear, causing the snapping rolls to tear the ears free from the stalk. The loose ears are then transferred via gathering chains, augers and elevators to the crop processing unit.

U.S. Pat. No. 3,462,928 to Schreiner, et al discloses a harvester snapping roll configuration wherein the rolls are supported in cantilever fashion from the gear housing which provides driving power. Each snapping roll is relatively short and the forward end of the roll is unsupported. The rolls are fluted along their length and the effective diameter tapers from nose to the base at the gear housing end.

The U.S. Pat. No. (3,174,484) to Anderson shows a snapping roll construction composed of simple elements that are easy to assemble. The flutes on the Anderson roll structure comprise two pieces of L-shaped angle iron stock bolted to opposite faces of a square central shafting or equivalent.

Neither of the above achieve the crop processing action of our invention. With Anderson, the spacing between the tips of the flutes remains the same throughout the main body of the adjacent rolls. In Schreiner, etal there are a series of similar flutes which taper so as to overlap more near the base than at the tip end. Spacing between the flutes of adjacent rolls does not change as the rolls rotate. With our invention there are two kinds of axially extending flutes. Both are tapered so that there is more overlap at the base than at the tip of the roll. The odd numbered flutes on each roll extend radially outward from the center of the roll. The even numbered flutes, while having their roots spaced equidistant from the odd numbered adjacent flutes, extend outward at an angle which is between 20 and 30 degrees removed from the radial direction. Synchronous rotation of the adjacent rolls brings about an action which grips an interposed stalk of corn first tighter, then looser. The cyclically repeated action was found to both do a better job of snapping off ears at the butt end of the cob and keeps the corn plant intact which improves processing of stalks, leaves and weeds, thereby, significantly increasing the amount of trash removed by the snapping rolls.

SUMMARY OF THE INVENTION

This invention concerns a pair of snapping rolls which are part of each of the row units on the corn head of a processing unit. The snapping rolls are positioned side by side and slightly apart beneath a stripper plate having a force and aft extending slot through which the stalks of a row of standing corn enter into a row unit. The snapping rolls rotate in opposite directions and serve to draw the stalks of corn downwardly through the row unit until the ears thereon contact the stripper plate. As the snapping rolls continue turning, each stalk is torn free from the ear whose butt end is too wide to pass through the slot in the stripper plate. The loose ears thus separated from the stalks are then moved by gathering chains, augers and elevating belts into the processing unit.

Each snapping roll includes a central shaft which is journaled for rotation near its forward projecting end. The journaled area allows the forward projecting end of the snapping roll to be supported by the frame of the row unit. The central shaft at the base end of each snapping roll is drivingly connected by gear means to the main corn head drive. The gear means for a pair of snapping rolls is arranged so that rotation of the two rolls is synchronized, with the direction of one being opposite that of the other, rotation being such that when the rolls are viewed rearward from their forward projecting ends, the roll on the right turns counterclockwise while the roll on the left turns clockwise.

There are an even number of axially extending flutes on the surface of each snapping roll. All of the odd numbered flutes (1, 3, 5, etc.), on each snapping roll extend radially outward with the height of each flute increasing as one progresses axially from the forward projecting end of the roll toward the base. All odd numbered flutes are indentical on both snapping rolls.

Interspersed between the odd numbered flutes are a like number of even numbered flutes (2, 4, 6, etc.). The even numbered flutes do not project outward along a radial line from the shaft axis. Each extends outward at an angle which is between 20 and 30 degrees removed from the radial direction. Each even numbered flute is axially continuous, extending outward such that the tips of both the odd and even flutes all lie on the same imaginary circle placed concentric with the axis of the central shaft. This means that the height of the even numbered flutes also increases as one progresses from the forward projecting end of the roll toward the base. Using this type of configuration the spacing at the tips between consecutive flutes differs. Starting at the first or odd numbered flute, it will be farther from the tip of the first flute to the tip of the second flute than from the second to the tip of the third flute. For the case where the snapping roll has a total of six flutes, the tip of the second flute is over 50 percent farther from the tip of the first flute than the second is from the tip of the third.

The angular position of the two snapping rolls, relative to each other is such that the flutes intermesh. The angular position of one roll is established such that one snapping roll is turned 360 degrees divided by twice the number of flutes per roll. For example, if there were a total of six flutes on a roll, the angular position of one roll would be turned so as to be 360÷(2×6) or 30 degrees away from the other. With every other flute extending outward at a non-radial angle and the two snapping rolls turning in unison, the result is that the flutes of one roll intermesh with those of the other such that opposing flutes are first close together, then farther apart, then close together, etc.

Applicants found that this cyclic open-closed arrangement provides very beneficial results. First, it improves the capability of the snapping rolls to remove the ear while drawing all of the rest of the corn plant into the void below the corn head, thereby delivering a cleaner product to the processor. Second, the use of a pulsing open-close arrangement of intermeshed flutes was found to enhance the ability of the snapping rolls to reacquire the end of a stalk of corn which breaks due to the impact of the ear against the stripper plate. Other objects and advantages of the present invention will become apparent to those skilled in the art following the description of the preferred embodiment shown in the accompanying drawings.

IN THE DRAWINGS

FIG. 1 is a top view of a pair of corn harvester snapping rolls showing the open throat arrangement at the roll tips and the overlap of flutes near the base.

FIG. 2 is a sectional view taken substantially along line 2—2 of FIG. 1 and showing the relative position of the stripper plate.

FIG. 3 is a sectional view of the rolls of FIG. 1 taken along line 3—3 and having the rolls turned through an angle of 30 degrees with respect to FIG. 2.

FIG. 4 is a sectional view of the rolls along line 3—3 of FIG. 1 and having the rolls turned through an angle of 90 degrees with respect to FIG. 2.

DESCRIPTION OF THE PREFERRED EMBODIMENT

Figure 5:
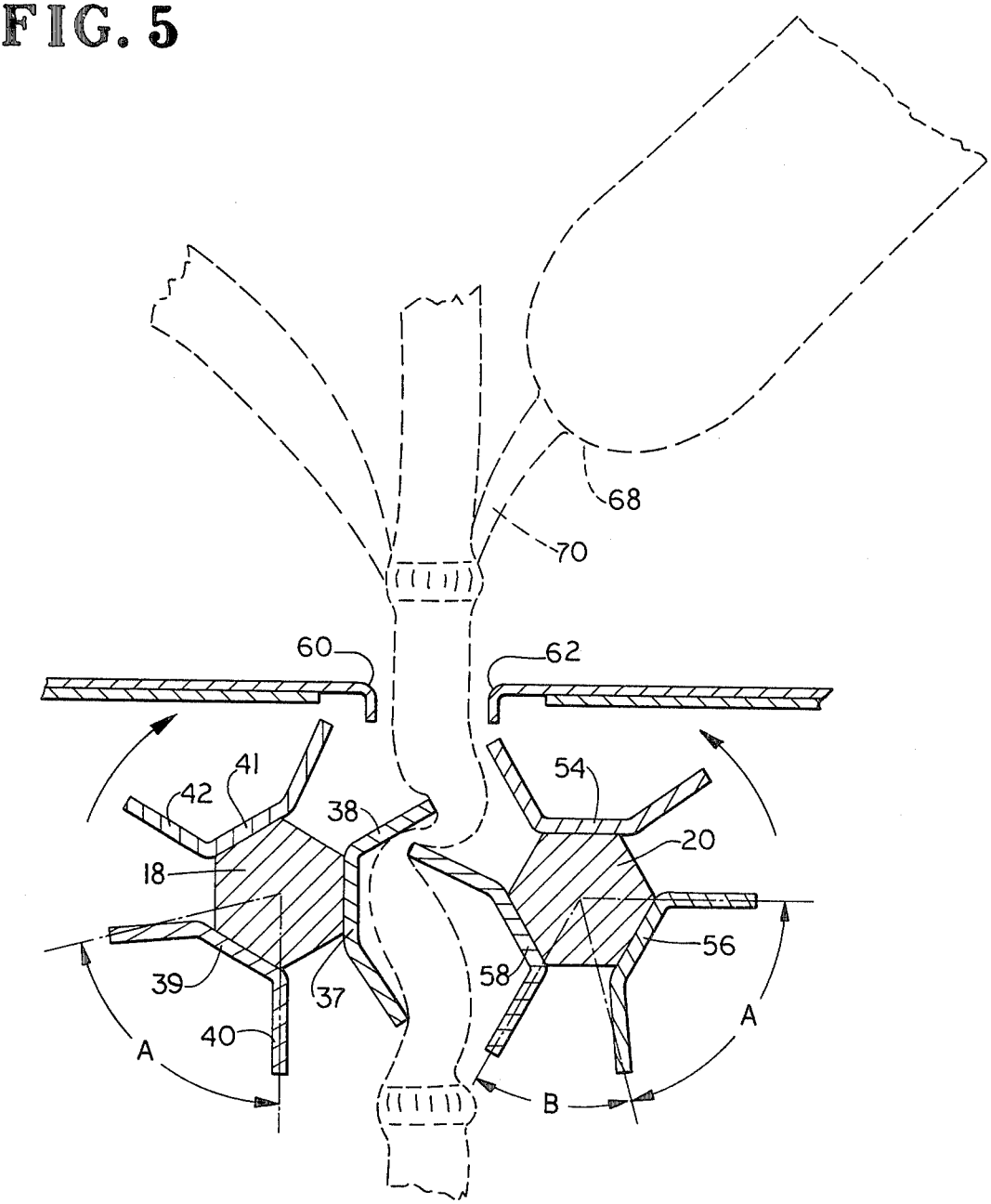
FIG. 5 is a sectional view of the rolls along line 3—3 of FIG. 1 and turned 60 degrees with respect to FIG. 2, and further showing the manner in which a stalk of ear corn is grasped.

The snapping rolls 10 and 12 shown in FIG. 1 will be supported on the frame of a corn head row unit (not shown). Several of these row units will be mounted across the front of a corn head. Usually 3, 4, 6 and 8 row unit configurations are available in conventional type corn harvesters. It is contemplated that each row unit will include a gear housing (not shown) which both supports and drives the shafts 14 and 16 of snapping rolls 10 and 12. By this is meant that the aforementioned gear housing will include appropriately spaced bearing mounts for rotatably supporting shafts 14 and 16 at the base end of the snapping rolls.

In the unit reduced to practice (See FIGS. 1 and 2) each of the snapping rolls 10 and 12 are comprised of a hexagonal central shaft 18 and 20 respectively. Hexagonal central shaft 18 has a cap 22 mounted on its forward projecting end. Cap 22 has a rounded projecting end. Immediately below cap 22 (See FIG. 1) is frustro-conical section 24 having at the end adjacent cap 22 a land 26 on which is journaled one end of support member 28. It will be understood that the second end of support member 28 is secured to the frame of the row unit, for example by bolts. Both end cap 22 and frustro-conical section 24 were cast parts in the unit reduced to practice. Both can be secured to central shaft 18 by set screws (not shown) or other suitable means. Cap 22 includes on its periphery a helix 30 which helps to carry stalks of corn toward the base. Frustro-conical section 24 has six tapered flutes extending therefrom.

Snapping roll 12 is configured the same as roll 10. Roll 12 has end cap 32 and frustro-conical section 34 with support member 36 secured thereon. It will be understood that the second end of support member 36 is secured to the frame of the row unit (not shown).

Below the frustro-conical sections 24 and 34, the hexagonal central shaft areas are fitted with roll plates. FIG. 2 shows a cross sectional view of the roll plates. Central shaft 18 has three indentical roll plates mounted thereon, namely roll plates 37, 39 and 41. In the unit reduced to practice, roll plates 37, 39 and 41 were secured to central shaft 18 by means of bolts 44, 46 and 48 respectively. In the unit reduced to practice, each roll plate was secured to the central shaft by means of three bolts spaced at intervals along its length. The central region of each roll plate is flat and extends along one of the hexagonal faces of the central shaft. One edge of each of the roll plates, 37, 39 and 41 is bent upwards so that it forms a flute which is along a radial extending from the axis of central shaft 18 through the vertices of the hexagonal shaft. In FIG. 2 these are shown as radial extending flutes 38, 40 and 42. The second edge of each roll plate is also bent in an upward direction. Referring to roll plate 39 (See FIG. 2) it will be seen that second edge 50 is bent upward a lesser amount than is needed to reach the radial direction. The amount by which it fails to reach the radial direction is shown by angular value 52. An angular value 52 equalling 15 degrees was found to perform satisfactorily.

The net result of this flute arrangement is that (See FIG. 2) the tips thereof are not spaced at equal intervals. There are two flute tips far apart followed by two tips close together. Placement of the second snapping roll at an angle which is rotated 30 degrees with respect to the first snapping roll results in the orientation shown in FIG. 2. Roll plate 54 is a companion to roll plate 37. Roll plate 56 correlates with 39 and roll plate 58 correlates with 41. The snapping rolls rotate in the directions shown by arrows 64 and 66 with the tips of the flutes passing in close proximity to the bottom surface of stripper plate slot edges 60 and 62. The spacing between stripper plate slot edges 60 and 62 is made adjustable by means not shown in order to accommodate various types of corn.

The drawing sequence shown in FIGS. 2, 3, 4 and 5 depicts what happens as the snapping rolls 10 and 12 are successively turned by 30 degree increments. If it is assumed that the drawing in FIG. 2 signifies an orientation of zero degrees, then FIG. 3 signifies the relative orientation of the snapping rolls 30 degrees later, FIG. 4 the relative orientation 90degrees later and FIG. 5 is the relative orientation 60 degrees beyond that depicted in FIG. 2. Like parts have been labeled the same in FIGS. 2-5. The sequence of figures shows that adjacent flutes on the two snapping rolls are first relatively far apart, then closer together. FIG. 5 shows that opposing flutes pinch deeply into a stalk of corn when the rolls have the orientation shown. If, by chance, the pinching action of the opposing flutes should snap off the stalk when the rolls are in the FIG. 5 orientation, the open stance of the next pair of flutes rotating into view, will grasp onto the severed stalk before it can fall free.

In the unit reduced to practice, roll plates provided the flute tips shown in FIG. 5. The angular dimension A was equal to 80 degrees whereas dimension B was equal to 40 degrees. With this orientation, the cyclic open and tight intermeshing of the flutes achieves an improved harvesting action. The tightly grasped stalk of corn is drawn forcefully downward when the butt of the ear 68 strikes the stripper plate on either side of edges 60 and 62. Further, the tightly gripped location on the stalk will be approximately on a line between the axes of central shafts 18 and 20. When the flutes are oriented to grip the stalk tightly at the midregion between the axes of the central shafts, the next pair of flutes rotating toward one another in the region below the stripper plate slot will always remain somewhat separated from one another, reaching finally the configuration shown in FIG. 4.

This configuration of the flutes on the snapping rolls was found to do a better job of harvesting corn. Ears are always snapped cleanly from the stalk. There is no tendency to leave the connecting stem 70 (See FIG. 5) on the butt of the ear. The cyclic open, then closed stance of the intermeshed flutes control the processing of stalks, leaves and weeds in such a way as to significantly increase the amount of trash that can be removed by the snapping rolls. Weeds, leaves and pieces of corn stalks pass through the rolls into the void below the corn head.

While the preferred embodiment shows a snapping roll configuration having a hexagonal central shaft and three bolted-on roll plates, it is not the intention to limit the invention to this structure. The principles of the invention will apply as well to a cast roll structure. The concepts set forth will be understood by those skilled in the art to include any implementation wherein the flutes are configured to intermesh cyclically, first tightly, then loosely. Further, the invention is not restricted to a snapping roll having six flutes. The criteria is to have an even number of flutes on each roll, for example 4, 6 or 8, with the height of the flutes gradually increasing from the forward extending end of the snapping roll toward the base.

We claim:

1. In a corn head attachment adapted to be mounted at the forward end of a corn harvester, said corn head having a forward projecting row unit which includes a subframe on which is supported a stripper plate having a fore and aft extending slot for receiving stalks of corn, said row unit also including a pair of spaced apart forward projecting gear driven elements, said elements being arranged equidistant and symmetrically below and at the rearmost end of the slot in said stripper plate, the leftmost one of said elements as viewed from a position forward of said row unit being rotatably driven clockwise by said gear means whereas the rightmost one of said elements is driven counter-clockwise by said gear means, the axes of said elements being parallel both to each other and with the plane containing said stripper plate, the improvement which comprises:

a pair of fore and aft extending snapping rolls, each having a central shaft, said snapping rolls being transversely spaced apart beneath said stripper plate on opposite sides of the slot therein, the base end of the first roll being drivingly connected to and in axial alignment with the leftmost of said elements, the base end of the second roll being drivingly connected to and coaxially aligned with the rightmost of said elements;

a number of longitudinally extending flutes arranged in two sets around the periphery of each of said snapping rolls;

one set of flutes extending in a radially outward direction relative to the axis of the snapping rolls;

a second set of flutes extending outwardly in a non-radial angle relative to the axis of said rolls, said second set of flutes being interspersed between the radially outward directed set of flutes;

the height of said flutes being such that the tips of said odd and even numbered flutes all lie on an imaginary circle placed concentric with and perpendicular to the axis of said snapping rolls, the maximum height of said flutes being such that the flutes of one roll must interleave with the flutes of the other roll throughout a portion of the length of said snapping rolls; and synchronizing means for rotating said snapping rolls in unison such that the sequence of intermeshing flutes in the region between the axes of said snapping rolls comprise the repetitious rotational passage of a non-radial flute from one roll, a non-radial flute from the second roll, a radial flute from the first roll, a radial flute from the second roll and repeat, the rotational passage of a non-radial flute generating an action whereby the stalk of corn is deeply pinched as it is drawn through said corn head.

2. The invention as defined in claim 1 wherein the height of each flute increases in a linear fashion from the forward end of said snapping rolls toward the aft end.

3. The invention as defined in claim 1 and including:

a concentric land near the forward projecting end of each of said snapping rolls;

a pair of support members, each having its first end rotatably attached to the concentric land of a snapping roll, the second end of each of said support members being fixedly secured to said subframe; and an end cap on each of said snapping rolls.

4. The invention as defined in claim 1 wherein the even numbered flutes extend outward at an angle which is between 20 and 30 degrees removed from the radial direction.

5. The invention as defined in claim 4 wherein there are six flutes on each snapping roll.

6. The invention as defined in claim 5 wherein the central shaft has a hexagonal cross section.

7. The invention as defined in claim 6 wherein the flutes are formed by securing three roll plates on every other face around the periphery of said central shaft, each roll plate being bent upward along one of its edges so as to form a flute which is directed radially outward from the apex formed by intersecting faces of the hexagonal central shaft, the second edge of said roll plate being bent upward at a lesser angle adjacent the next apex so as to form a non-radial flute.

* * * * *